United States Patent [19]

Bruckert

[11] Patent Number: 5,751,763
[45] Date of Patent: May 12, 1998

[54] METHOD AND APPARATUS FOR POWER CONTROL IN A COMMUNICATION SYSTEM

[75] Inventor: Eugene J. Bruckert, Arlington Heights, Ill.

[73] Assignee: Motorola, Inc., Schaumburg, Ill.

[21] Appl. No.: 616,801

[22] Filed: Mar. 15, 1996

[51] Int. Cl.[6] ............................................. H04K 1/00
[52] U.S. Cl. ........................... 375/200; 370/342; 455/522
[58] Field of Search ..................................... 375/200, 259; 370/320, 335, 342; 455/343, 33.1, 54.1, 88, 522

[56] References Cited

U.S. PATENT DOCUMENTS

| | | | |
|---|---|---|---|
| 4,261,054 | 4/1981 | Scharla-Nielsen | 455/69 |
| 5,241,690 | 8/1993 | Larsson et al. | 455/54.1 |
| 5,267,262 | 11/1993 | Wheatley, III | 370/320 |
| 5,452,473 | 9/1995 | Weiland et al. | 455/88 |
| 5,455,967 | 10/1995 | Amezawa et al. | 455/54.1 |
| 5,590,408 | 12/1996 | Weiland et al. | 455/69 |
| 5,629,937 | 5/1997 | Ghosh et al. | 370/335 |

*Primary Examiner*—Tesfaldet Bocure
*Attorney, Agent, or Firm*—Richard A. Sonnentag

[57] ABSTRACT

Reverse channel power control in a CDMA system is accomplished by measuring a power-control group transmitted from a remote unit (403) and determining a transmission time of a next power-control bit. The measurement of the power-control group is discontinued (405) based on the transmission time of the power-control bit and a round trip delay between the base station and the remote unit in order to transmit the power-control bit (419) to the remote unit in the next time slot.

19 Claims, 6 Drawing Sheets

METHOD AND APPARATUS FOR POWER CONTROL IN A COMMUNICATION SYSTEM

FIELD OF THE INVENTION

The present invention relates generally to communication systems and, in particular, to power control in a communication system.

BACKGROUND OF THE INVENTION

Communication systems are known to employ power control methods which control transmission energy of remote units. Once such communication system employing power control is a spread spectrum communication system. Power control in a spread spectrum system serves two main functions. Firstly, because each remote unit's signal in a spread spectrum system is typically transmitted in the same frequency, a majority of the noise (which is inversely proportional to bit energy per noise density i.e., $E_b/N_0$, which is defined as the ratio of energy per information-bit to noise-spectral density), associated with a received signal can be attributed to other remote units' transmissions. The magnitude of noise is directly related to the received signal power of each of the other remote units' transmissions. Thus it is beneficial for a remote unit to transmit at the lowest power level possible. Secondly, it is desirable to dynamically adjust the power of all remote units in such a way that their transmissions are received by the base station with approximately the same power level. To accomplish this, it is necessary for the closest transmitters to reduce their power by as much as 80 dB when compared to the power of the furthest transmitters.

A prior-art method of controlling reverse channel power control in a code-division, multiple-access (CDMA) spread spectrum system is described in Cellular System Remote unit-Base Station Compatibility Standard of the Electronic Industry Association/Telecommunications Industry Association interim standard 95 (TIA/EIA/IS-95A), which is incorporated by reference herein. (EIA/TIA can be contacted at 2001 Pennsylvania Ave. NW. Washington, D.C. 20006). As described in TIA/EIA/IS-95A section 7.1.3.1.7, a power-control subchannel is continuously transmitted on a forward traffic channel. At time slot "k", the base station receives a power-control group transmitted from the remote unit. At time slot "k+1" the base station calculates a power adjustment command to send to the remote unit. At time slot "k+2" the base station transmits the power adjustment command to the remote unit. Finally, at timeslot "k+3", the base station receives the remote unit's transmitted signal at the corrected power level. This process of having a remote unit's power adjustment delayed until the third time slot after the base station receives a power-control group can negatively impact reverse channel performance.

Thus a need exists for a remote unit's power adjustment to take place prior to the third time slot after a base station receives the remote unit's power-control group.

DESCRIPTION OF A PREFERRED EMBODIMENT

Reverse channel power control in a CDMA system is accomplished by adjusting the measurement time of a power-control transmission (power-control group) transmitted by a remote unit in order to calculate and transmit a power adjustment command (power-control bit) to the remote unit in the next power-control group transmitted by the base station. Transmitting a power adjustment command (power-control bit) in the next power-control group transmitted to the remote unit allows the base station to receive power-control adjustments in the second timeslot (k+2) after measurement of the power-control group which improves reverse channel performance by as much as 1 dB $E_b/N_0$.

Generally, the present invention encompasses measuring a power-control transmission and discontinuing the measurement of the power-control transmission prior to completion based on a transmission time of a power adjustment command.

An alternate embodiment encompasses a method of power control in a code-division, multiple-access (CDMA) communication system comprising the steps of beginning measurement of a power-control group and determining a transmission time of the next power-control bit. The measurement of the power-control group is then discontinued based on the transmission time. Finally a calculated power-control bit is transmitted to a remote unit.

Yet another alternate embodiment encompasses an apparatus for controlling power in a communication system. The apparatus comprises an integrator for measuring a power-control transmission and a logic unit for discontinuing the measurement of the power-control transmission based on a transmission time of a power adjustment command.

Another embodiment encompasses a method for power control in a communication system. The method comprises the steps of determining a transmission time of a power adjustment command and estimating the power-adjustment command based on a previous power-adjustment command if the transmission time of the power adjustment command is below a threshold. If the transmission time of the power adjustment command is above the threshold, the power-adjustment command is estimated based on a shortened measurement of a power-control group.

Yet another embodiment encompasses a method of power control in a communication system. The method comprises the steps of determining a transmission rate of a remote unit and switching between a two time slot delay and a three time slot delay when applying a power control command, where the switching is based on the transmission rate.

Figure 1:
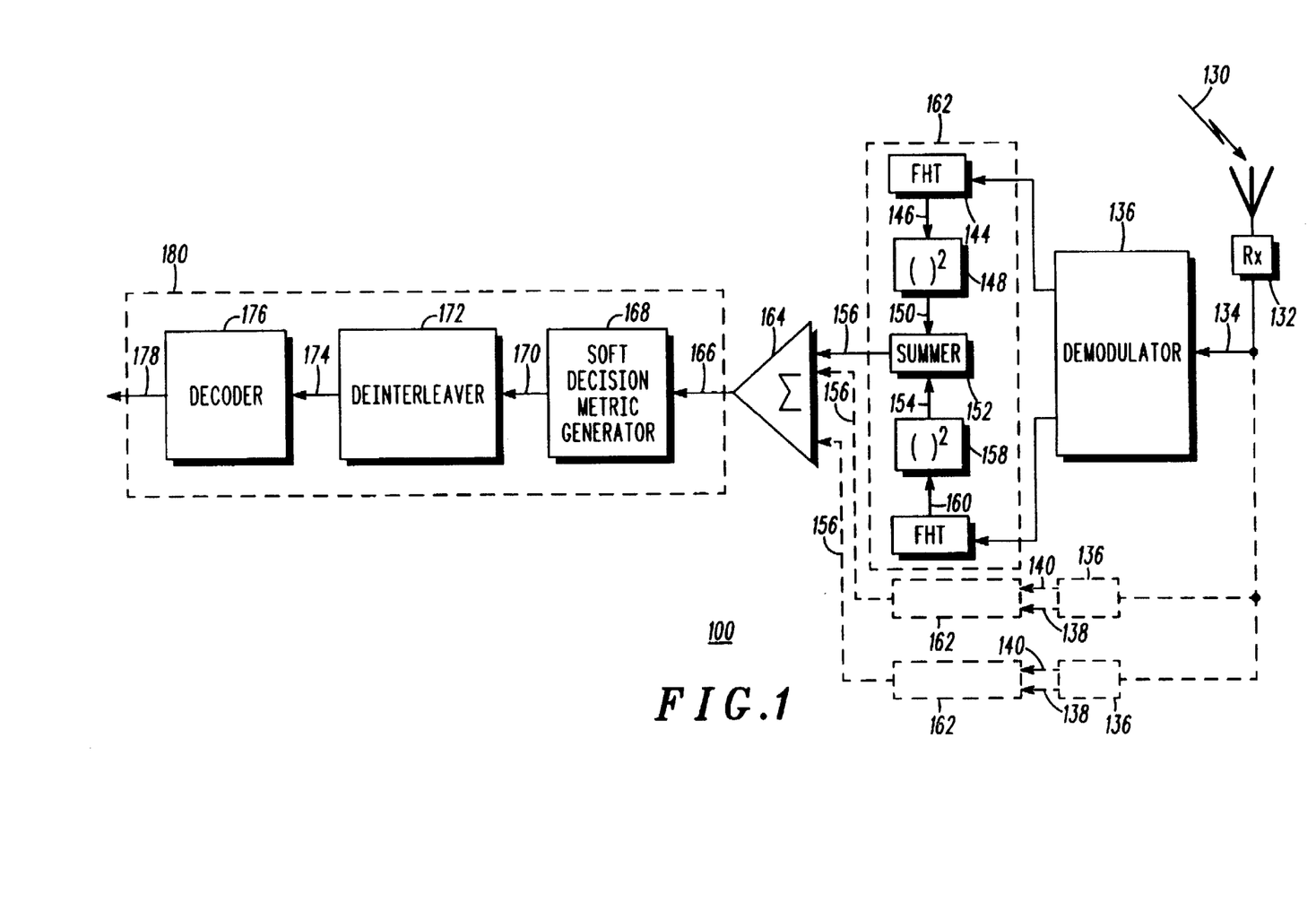
FIG. 1 is a block diagram of a preferred embodiment of a base station receiver that can utilize the present invention.

FIG. 1 is a block diagram of a preferred embodiment of a base station receiver 100 for receiving a power-control group transmitted by a remote unit. Orthogonally encoded spread-spectrum digital signal 130 is received at receive antenna 131 and amplified by receiver 132 before being despread and demodulated 136 into in-phase 140 and quadrature 138 components. Components 138, 140 of despread digital samples are then grouped into predetermined length groups (e.g., 64 sample length groups) of sampled signals that are independently input to orthogonal decoders in the form of fast Hadamard transformers 142, 144, which despread the orthogonally encoded signal components producing a plurality of despread signal components 146 and 160, respectively (e.g. when 64 sample length groups are input, then 64 despread signals are generated). In addition, each transformer output signal 146, 160 has an associated Walsh index symbol which identifies each particular orthogonal code from within a set of mutually orthogonal codes (e.g. when 64 sample length groups are input, then a 6 bit length index data symbol can be associated with the transformer output signal to indicate the particular 64 bit length orthogonal code to which the transformer output signal corresponds). The energy values with the same Walsh index in each group of resulting signal 156 from each branch of receiver 100 will then be summed at summer 164 to provide a group of summed energy values 166. The energy value with index i in the group of summed energy values 166 corresponds to a measure of confidence that the group of sampled signals, which generate this group of summed energy values 166, corresponds to the i-th Walsh symbol. The group of summed energy values with associated indices will then be sent to a soft decision metric generator (such as a dual maxima metric generator) 168 where a single metric for each encoded data bit is determined, thereby producing a single set of aggregate soft decision data 170. The aggregate soft decision data 170 is then deinterleaved by deinterleaver 172 prior to final maximum likelihood decoding by decoder 176.

Figure 2:
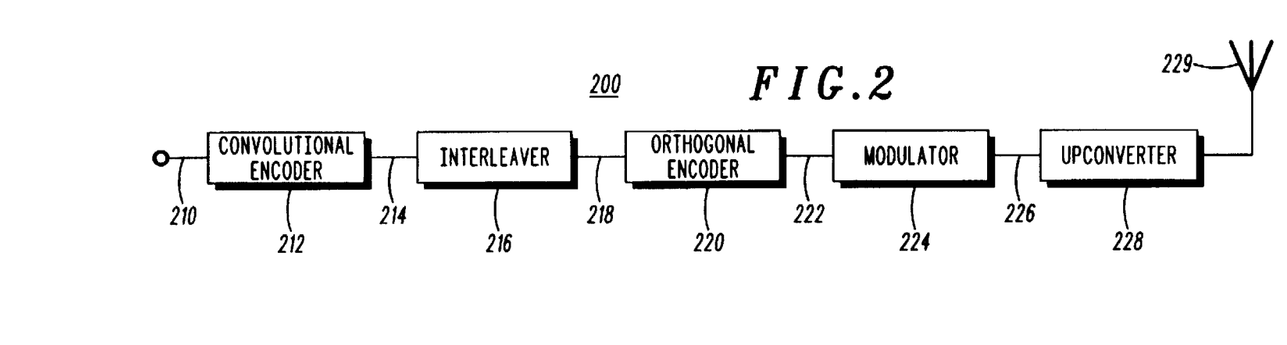
FIG. 2 is a block diagram of a preferred embodiment of a base station transmitter that can utilize the present invention.

FIG. 2 is a block diagram of a preferred embodiment of a CDMA transmitter 200 for transmitting a power-adjustment command to a remote unit. In a preferred embodiment the power-adjustment command is a power-control bit such that a "0" bit indicates to the remote unit to increase the mean output power level, and a "1" bit indicates to the remote unit to decrease the mean output power level. Transmitter 200 is preferably a transmitter such as that defined by TIA/EIA/IS-95A. Transmitter 200 includes convolutional encoder 212, interleaver 216, orthogonal encoder 220, modulator 224, upconverter 228, and antenna 229.

During operation, signal 210 (traffic channel data bits) is received by convolutional encoder 212 at a particular bit rate (e.g., 9.6 kbit/second). Input traffic channel data 210 bits typically include voice converted to data by a vocoder, pure data, or a combination of the two types of data. Convolutional encoder 212 encodes input data bits 210 into data symbols at a fixed encoding rate with an encoding algorithm which facilitates subsequent maximum likelihood decoding of the data symbols into data bits (e.g. convolutional or block coding algorithms). For example, convolutional encoder 212 encodes input data bits 210 (received at a rate of 9.6 kbit/second) at a fixed encoding rate of one data bit to two data symbols (i.e., rate 2/2) such that convolutional encoder 212 outputs data symbols 214 at a 19.2 ksymbol/second rate.

Data symbols 214 are then input into interleaver 216. Interleaver 216 interleaves the input data symbols 214 at the symbol level. In interleaver 216, data symbols 214 are individually input into a matrix which defines a predetermined size block of data symbols 214. Data symbols 214 are input into locations within the matrix so that the matrix is filled in a column by column manner. Data symbols 214 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 218 are output by interleaver 216 at the same data symbol rate that they were input (e.g., 19.2 ksymbol/second). The predetermined size of the block of data symbols defined by the matrix is derived from the maximum number of data symbols which can be transmitted at a predetermined symbol rate within a predetermined length transmission block. For example, if the predetermined length of the transmission block is 20 milliseconds, then the predetermined size of the block of data symbols is 19.2 ksymbol/second times 20 milliseconds which equals 384 data symbols which defines a 16 by 24 matrix.

Interleaved data symbols 218 are input to orthogonal encoder 220. Orthogonal encoder 220 modulo 2 adds an orthogonal code (e.g., a 64-ary Walsh code) to each interleaved and scrambled data symbol 218.

For example, in 64-ary orthogonal encoding, interleaved and scrambled data symbols 218 are each replaced by a 64 symbol orthogonal code or its inverse. These 64 orthogonal codes preferably correspond to Walsh codes from a 64 by 64 Hadamard matrix wherein a Walsh code is a single row or column of the matrix. Orthogonal encoder 220 repetitively outputs a Walsh code or its inverse 222 which corresponds to input data symbol 218 at a fixed symbol rate (e.g., 19.2 ksymbol/second).

The sequence of Walsh codes 222 is prepared for transmission over a communication channel by modulator 224. The spreading code is a user specific sequence of symbols or unique user code which is output at a fixed chip rate (e.g., 1.228 Mchip/second). In addition, the user code spread encoded chips are scrambled by a pair of short pseudorandom codes (i.e. short when compared to the long code) to generate an I-channel and Q-channel code spread sequence. The I-channel and Q-channel code spread sequences are used to bi-phase modulate a quadrature pair of sinusoids by driving the power level controls of the pair of sinusoids. The sinusoids output signals are summed, bandpass filtered, translated to an RF frequency, amplified, filtered via upconverter 228 and radiated by an antenna 229 to complete transmission of the channel data bits 210.

Figure 3:
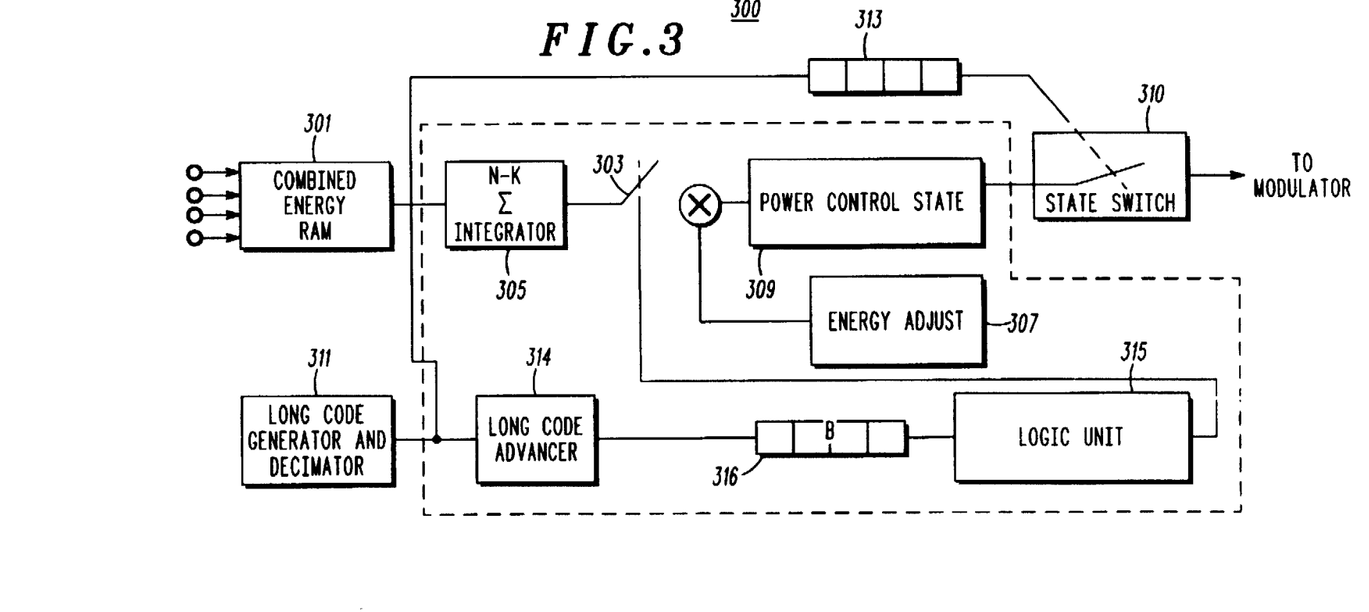
FIG. 3 illustrates an apparatus for receiving a power-control group and transmitting a power adjustment command in accordance with a preferred embodiment of the present invention.

FIG. 3 illustrates an apparatus 300 for receiving a power-control group (via a receiver described in FIG. 1) and transmitting a power adjustment command (via transmitter described in FIG. 2) in accordance with a preferred embodiment of the present invention. Apparatus 300 includes combined energy random access memory (combined energy RAM) 301, integrator 305, switch 303, energy adjust unit 307, power-control state machine 309, state switch 310, long code generator 311, long code advancer 314, and logic unit 315. Operation of apparatus 300 in accordance with a preferred embodiment of the present invention occurs as follows. A power-control group enters combined energy RAM 301 where an energy of N modulation symbols transmitted in the power-control group (N=6 for IS-95A) is measured and stored. In many situations it will be necessary to cut short the measurement of all N modulation symbols in the power-control group in order to transmit a power-control bit in the next power-control group transmitted by the base station. The time needed to cut short the measurement of the power-control group is determined by logic unit 315.

Long code generator 311 outputs a long code to the long code advancer 314. Long code advancer 314 advances the long code by at least the power-control bit calculation time ($T_{calc}$) added to the round trip delay time ($T_{rtd}$) (i.e. $T_{calc}+T_{rtd}$). This is done in order to determine the value of the long code for calculating the power-control bit location within the next power-control group. Logic unit 315 receives the advanced long code 316 from long code advancer 314 and determines from the advanced long code 316 at which of the 16 possible starting positions the power-control bit is transmitted. In a preferred embodiment (incorporating the TIA/EIA/IS-95A standard), the power-control bit is transmitted $T(b)=1.25*^b/_{24}$ ms into the next power-control group, where "b" is the number of the modulation symbol (0 to 15) that the power-control bit is transmitted on. In order for the base station to transmit the power-control bit on time, $T_{rtd}$ between the base station and the remote unit needs to be taken into consideration. If $T_{calc}$ is taken into consideration, the measurement of the power-control group needs to be cut short by at least $T_{adv}$, where:

$$T_{adv} = T_{calc} - T(b) + T_{rtd} \quad \text{if } T_{calc} - T(b) + T_{rtd} \geq 0,$$
$$T_{adv} = 0 \quad \text{if } T_{calc} - T(b) + T_{rtd} < 0.$$

Utilizing TIA/EIA/IS-95A (1.25 ms power-control group), the total time in which the power-control group is measured is:

$$T_{measure} \leq 1.25 \text{ ms} - T_{adv}.$$

Once logic unit 315 has calculated the time necessary to measure the power-control group, it transmits this time to switch 303, which closes at the appropriate time passing the information regarding energy of the acquired modulation symbols to integrator 305. Integrator 305 sums the acquired modulation symbols and outputs a summed value to energy adjust unit 307. Energy adjust unit 307 estimates the value of the summed modulation symbols had all N modulation symbols in the power-control group been acquired. In the preferred embodiment, this is done simply by multiplying the summed value by $$\frac{.00125}{T_{measure}}$$

where 0.00125 is the total time of a power-control group transmission.

The adjusted value of the summed modulation symbols is output to the power-control state machine 309. Power-control state machine 309 uses the adjusted value of the summed modulation symbols to determine the value ("0" or "1") of a power-control bit, and outputs this value to state switch 310. State switch 310 determines from the long code (generated by long code generator 311) which of the 16 possible starting positions the power-control bit is to be transmitted in and transmits the power-control bit accordingly.

Figure 4:
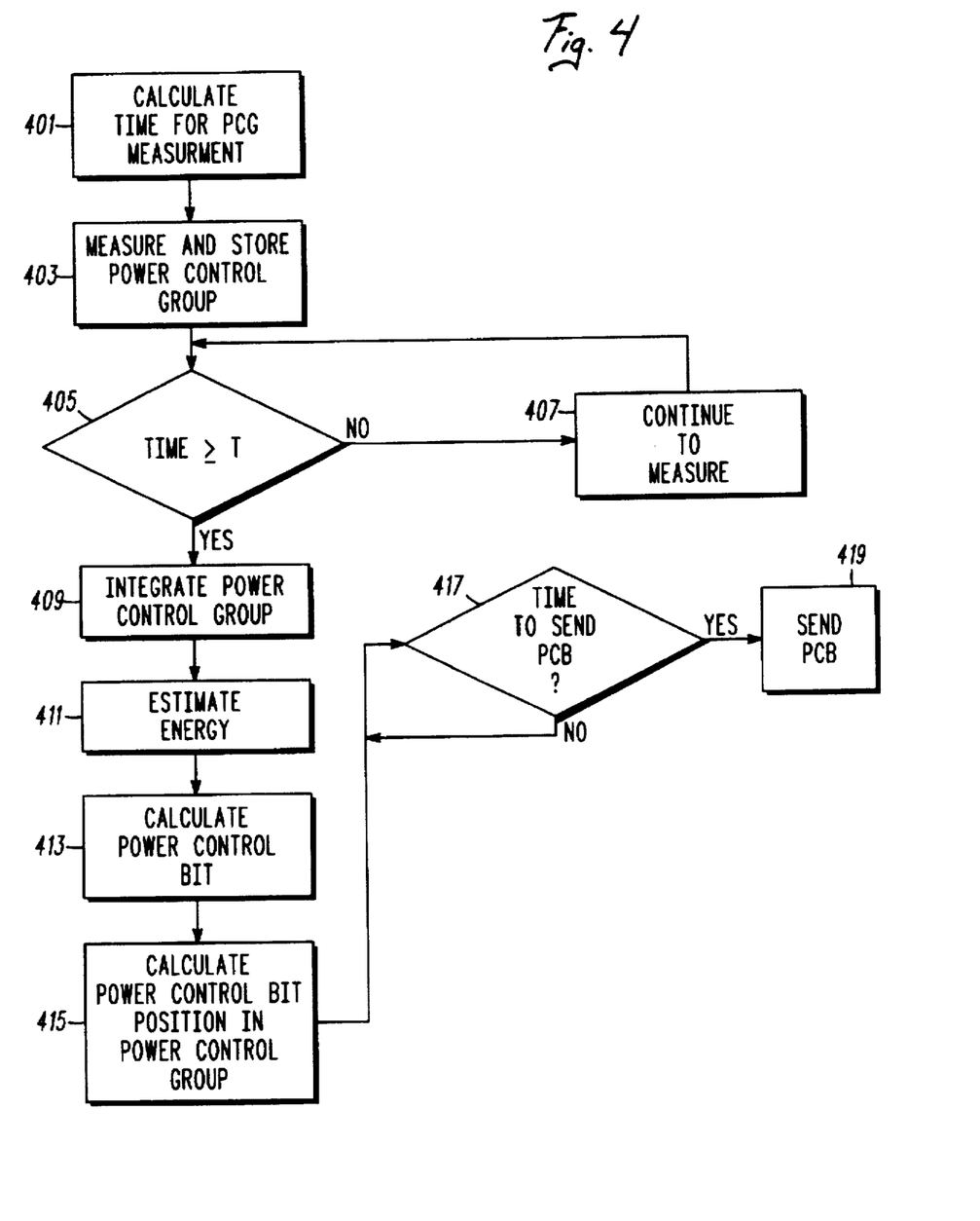
FIG. 4 is a flow chart of a method of controlling reverse channel power in a code-division multiple-access system in accordance with a preferred embodiment of the present invention.

FIG. 4 is a flow chart of a method of controlling reverse channel power in a CDMA system in accordance with a preferred embodiment of the present invention. The logic flow begins at step 401 where a time needed to measure the power-control group is determined. In a preferred embodiment, the power-control group is measured for $$T_{measure} \leq 1.25 \text{ ms} - T_{adv},$$

where $$T_{adv} = T_{calc} - T(b) + T_{rtd} \quad \text{if } T_{calc} - T(b) + T_{rtd} \geq 0,$$
$$T_{adv} = 0 \quad \text{if } T_{calc} - T(b) + T_{rtd} < 0.$$

Next, at step 403 the measurement is started at the beginning of the power-control group. At step 405 it is determined if $T_{measure}$ will be exceeded for continued measurement of the power-control group, and if not, at step 407 the measurement of the power-control group continues.

When continued measurement of the power-control group exceeds $T_{measure}$ the logic flow continues to step 409 where the measured power-control group is integrated. Next, at step 411 an estimate is made of the power-control group for the condition if all N modulation symbols in the power-control group had been acquired. In a preferred embodiment, this is done simply by multiplying the summed value by $$\frac{.00125}{T_{measure}}.$$

At step 413 the power-control bit is determined and at step 415 the power-control bit's position within the power-control group is determined. Next, at step 417 it is determined if it is time to send the power-control bit, and if so, at step 419, the power-control bit is sent to the remote unit, otherwise the logic flow simply returns to step 417.

In a preferred embodiment it is desirable that the remote unit change power at the beginning of a spread symbol, thus a new field of certain control messages is defined to allow the remote unit to shift from a three power-control group delay, to a two power-control group delay, and vise versa. In particular, the remote unit will alert the base station that it is two power-control group delay capable when setting up a call, and the base station switches from a three to a two power-control group delay once enough statistics have been taken to assure that $T_{rtd}$ is not greater than a predetermined amount. In the preferred embodiment, an instant delay decision may be made on a random access message and the command may be relayed in the channel assignment message. After a call has been up for some time, $T_{rtd}$ may become too large, and the base station may direct the remote unit to switch back to the three power-control group delay mode.

Figure 5:
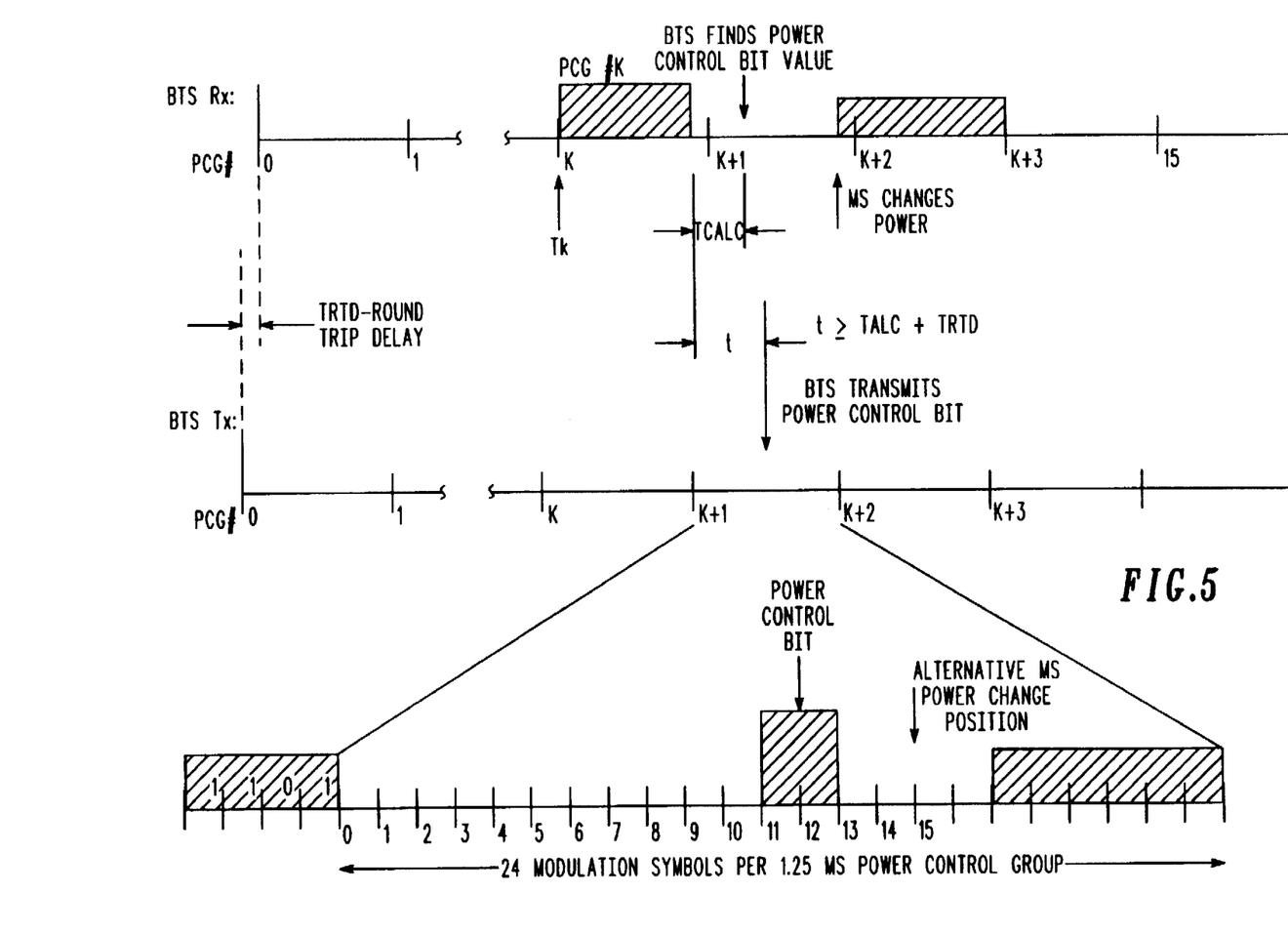
FIG. 5 illustrates a time-domain diagram of a controlling reverse channel power in a code-division multiple-access system in accordance with a preferred embodiment of the present invention.

FIG. 5 illustrates a time-domain diagram of controlling reverse channel power in a CDMA system in accordance with a preferred embodiment of the present invention. As shown in FIG. 5, the power-control group is measured in timeslot "k" over at most a $(1.25-T_{adv})$ ms period. At timeslot k+1 the base station estimates the value of the received power, determines the value of the power-control bit ("0" or "1"), and transmits the power-control bit to the remote unit. Finally, prior to timeslot k+2, the base station receives the remote unit's transmitted signal at the correct power level. Since the prior-art method of having a remote unit's power adjustment delayed until the third time slot after the base station receives a power-control group can negatively impact reverse channel performance, by having power adjustment take place in the second timeslot after measurement of the power-control group improves reverse channel performance by as much as 1 dB $E_b/N_0$.

Figure 6:
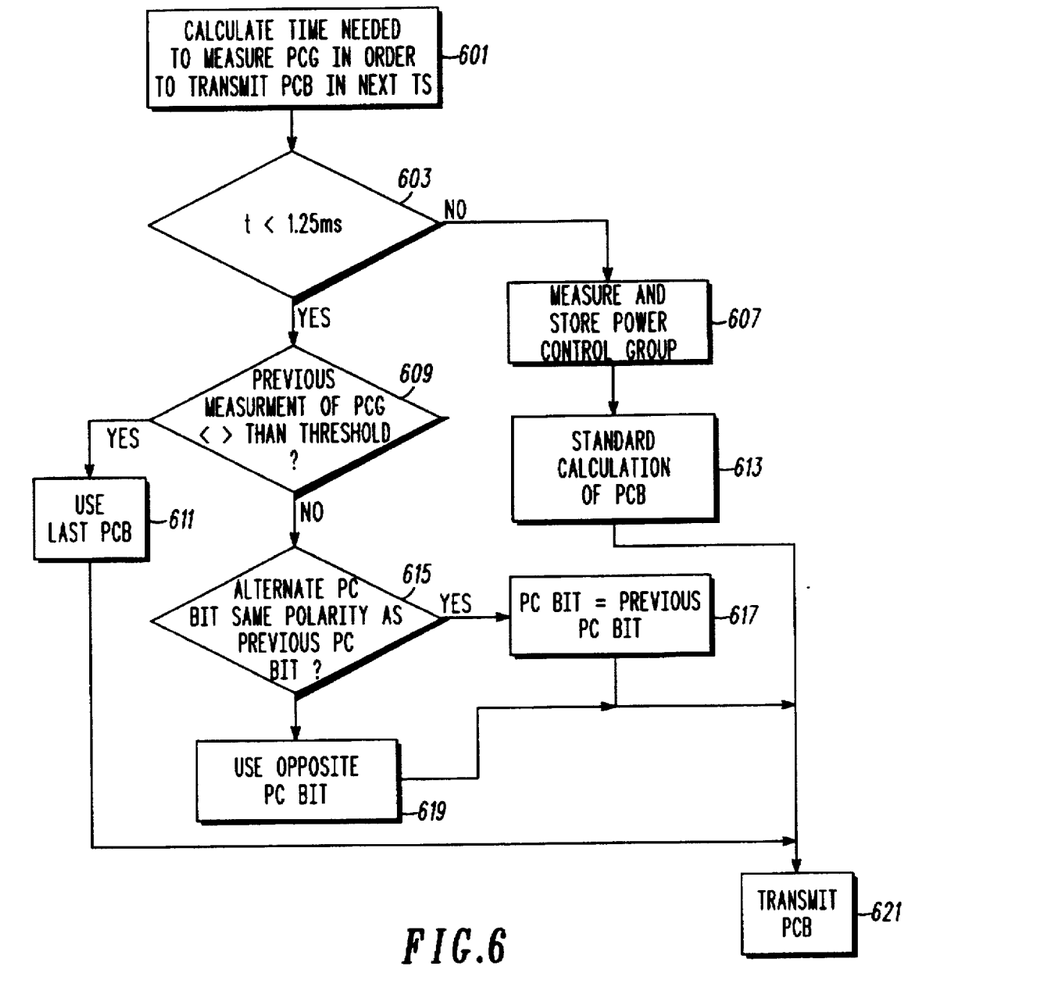
FIG. 6 is a flow chart of a method of controlling reverse channel power in a code-division multiple-access system in accordance with an alternate embodiment of the present invention.

FIG. 6 is a flow chart of a method of controlling reverse channel power in a CDMA system in accordance with an alternate embodiment of the present invention. Rather than cut into the power-control group measurement interval, this embodiment employs an algorithm to estimate the value of the power-control bit whenever the power-control bit slot appears too soon for the 1.25 ms energy measurement to be made with the power-control bit being transmitted in the next timeslot. Assuming the power-control and $T_{rxd}$ occurs within 50 ms, the algorithm would need to be invoked for only 1 of 16 power-control group measurements on average.

The logic flow begins at step 601 where a time needed to measure the power-control group and still be able to transmit the power-control bit in the next timeslot is measured. At step 603 it is determined if the time available to measure the power-control group is too small (e.g., <1.25 ms). If at step 603, it is determined that the time available to measure the power-control group is not less than 1.25 ms, then standard power control measurements and storage takes place (at step 607), and the standard calculation of the power-control bit takes place (at step 613). Finally the power-control bit is transmitted at step 621.

If at step 603 it is determined that the time available to measure the power-control group is less than 1.25 ms, then at step 609 it is determined if the prior measurement of the power-control group was less than, or greater than a predetermined amount. If the prior measurement was less than, or greater than a predetermined amount then at step 611 the value of the prior power-control bit is used for the current power-control bit value, and is transmitted at step 621. If at step 609 it is determined that the prior measurement of the power-control group was not less than, or was not greater than the predetermined amount, then at step 615 it is determined if the second prior power-control bit (power-control bit prior to the last power-control bit) was the same value as the prior power-control bit. If so, the value of the prior power-control bit is used for the current power-control bit value, and is transmitted at step 621. Otherwise the opposite value of the prior power-control bit is used for the current power-control bit value and is transmitted at step 621.

In yet another embodiment, an estimate of the power-control bit is accomplished by utilizing prior power-control bits (as discussed above), but only if $T_{measure}$ will be less than some minimum amount (400 µs for example). If, for example, $T_{measure}$ is below 400 µs, the power-control bit will be estimated by using prior power-control bit values, otherwise if $T_{measure}$ is greater than 400 µs, the power-control bit will be estimated by measuring the power-control group for a shortened period of time as discussed above.

When a remote unit is operating at less than full rate (i.e. not transmitting on certain frames), current TIA/EIA/IS-95A standards require that the remote unit does not apply a power-control bit generated corresponding to the time when the remote unit did not transmit a power-control group. Since the remote unit expects to receive a power-control bit in the third time slot after a power-control group is sent, the TIA/EIA/IS-95A standard has the remote unit ignoring power-control bits received three timeslots after a time slot in which the remote unit did not transmit a power-control group. Because a preferred embodiment of the present invention has the power-control bit being received by the remote unit one time slots after sending a power-control group, current TIA/EIA/IS-95A standards will have the remote unit ignoring power-control bits that it should not have, and vice versa. A solution for this problem is discussed in reference to FIG. 7.

Figure 7:
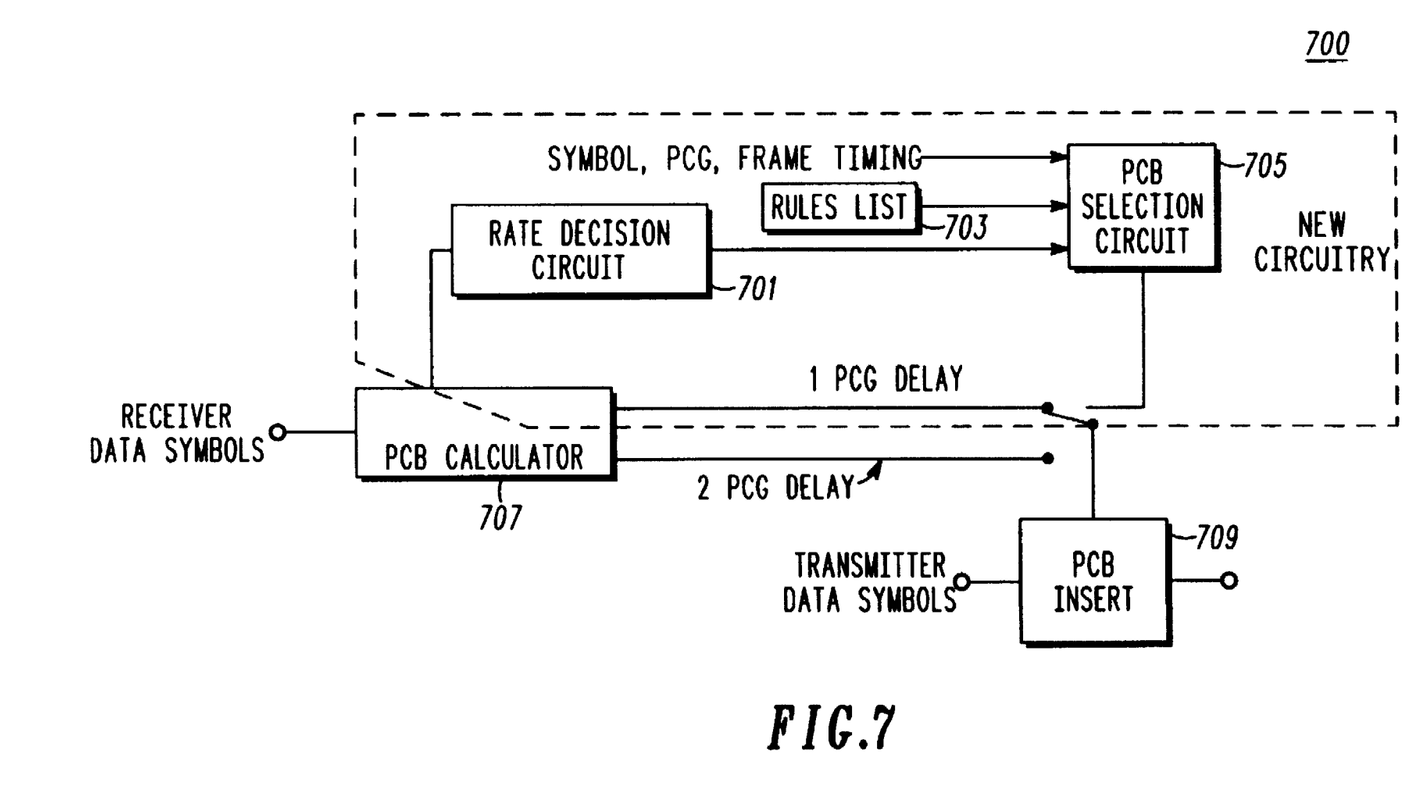
FIG. 7 illustrates an apparatus for controlling reverse channel power during sub-rate transmission in accordance with a preferred embodiment of the present invention.

FIG. 7 illustrates apparatus 700 for controlling reverse channel power during sub-rate transmission in accordance with a preferred embodiment of the present invention. The apparatus 700 comprises power-control bit calculator 707, rate decision circuit 701, rule list 703, power-control bit selection circuit 705, and power-control bit inserter 709. In a preferred embodiment power-control bit calculator 707 has two outputs. The first output is the value of the power-control bit for the last power-control group transmitted by the remote unit (as discussed above in reference to FIG. 5) while the second output is the value of the power-control bit for a power-control group transmitted by the remote unit two power-control groups prior (per EIA/TIA/IS-95A specification). Operation of apparatus 700 occurs as follows: Rate decision circuit 701 determines the current rate of operation (e.g., full, ½, ¼ or ⅛ rate). Rate information is output from the rate decision circuit 701 and input into power-control bit selection circuit 705. Power-control bit selection circuit 705 utilizes the rate information and rule list 703 to determine what power-control group to utilize (either one power-control group prior or two power-control groups prior) in determining the power-control bit to be inserted. Power-control bit selection circuit 705 then chooses the appropriate power-control bit (transmitted from power-control bit calculator 707) and outputs it to power-control bit inserter 709.

There are many frame rate estimators available for utilization by rate decision circuit 701. In a preferred embodiment, rate decision circuit 701 utilizes an energy and phase measurement based on the last four power-control groups transmitted by the remote unit. Thresholds are set to keep the falsely deciding full rate below an acceptable maximum. Amplitude (A) and phase measurements (Ø) of the previous four power-control groups are received and input to a decision mechanism. Steps that rate decision circuit 701 takes are shown in Table 1

TABLE 1

| Rate Decision Circuit Determination |
|---|
| (1) start |
| (2) set initial thresholds |
| (3) modify thresholds based on previous frame rate |
| (4) examine power-control groups 0–3    {A, Ø} per power-control group    {A, Ø} between power-control groups |
| (5) make initial rate estimate |
| (6) adjust thresholds |
| (7) examine next group of 4 power-control groups -    {A, } per power-control group    {A, } between power-control groups    include previous power-control group data |
| (8) modify rate estimate |
| (9) if end-of-frame, return to step (2); else return to step (7) |
| (10) end |

Rule list 703 for selecting the appropriate power-control bit (pcb) is shown below. The first column denotes the power-control group number (0 to 15) transmitted by the remote unit. The other three columns are for the various rates noted at the head of each. The contents of the list is the number of the power-control group (pcg) to use when calculating the appropriate power-control bit. After every fourth power-control group, a rate estimate update is made. The "rule" (marked "rule" in the table) listed for the half rate frame is to use the prior power-control bit if both the prior and alternate slots were active, otherwise, use an alternate power-control bit. The power-control bit is calculated as shown in Table 2.

TABLE 2

| Power-Control bit Utilization |
|---|
| PCG#    pcb selected from power-control group numbered: |

TABLE 2-continued

Power-Control bit Utilization

| | | | |
|---|---|---|---|
| 0 | 15 if slot 15 active; else pcb from slot 14 | | |
| 1 | 0 if slot 0 active for ⅛th rate and slot 15 active; else 15 | | |
| 2 | 0 | | |
| 3 | 1 | | |
| | ⅛th or ¼th | ½ | full |
| 4 | 2 | rule | 3 |
| 5 | 3 | rule | 4 |
| 6 | 4 | rule | 5 |
| 7 | 5 | rule | 6 |
| 8 | 6 | rule | 7 |
| 9 | 7 | rule | 8 |
| | (8 if slots 7 & 8 active) | | |
| 10 | 8 | rule | 9 |
| 11 | 9 | rule | 10 |
| 12 | 10 | rule | 11 |
| 13 | 11 | rule | 12 |
| 14 | 12 | rule | 13 |
| 15 | 13 | rule | 14 |

The descriptions of the invention, the specific details, and the drawings mentioned above, are not meant to limit the scope of the present invention. For example, instead of the above mentioned process to estimate the power-control bit, one could simply use a previous value of the power-control bit whenever the power-control bit insertion time comes too soon to complete the energy estimate. It is the intent of the inventors that various modifications can be made to the present invention without varying from the spirit and scope of the invention, and it is intended that all such modifications come within the scope of the following claims.

What is claimed is:

1. A method for power control in a communication system, the method comprising the steps of:

measuring a power-control transmission; and producing a discontinued measurement of the power-control transmission by discontinuing, prior to completion, the measuring of the power-control transmission based on a transmission time of a power adjustment command.

2. The method of claim 1 wherein the communication system comprises a spread-spectrum communication system.

3. The method of claim 1 wherein the communication system is a code division multiple access (CDMA) communication system.

4. The method of claim 1 wherein the step of measuring the power-control transmission comprises measuring a power-control group.

5. The method of claim 1 further comprising the steps of:

producing an estimated value of the power adjustment command; and transmitting the power adjustment command to produce a transmitted power adjustment command.

6. The method of claim 5 wherein the estimated value of the power adjustment command is based on the discontinued measurement of the power-control transmission.

7. The method of claim 5 wherein the estimated value of the power adjustment command is based on a previous value of the power adjustment command.

8. The method of claim 5 wherein the estimated value of the power adjustment command is based on a previous value of the power adjustment command and the transmission time of the power adjustment command.

9. A method of power control in a code-division, multiple-access (CDMA) communication system comprising the steps of:

beginning measurement of a power-control group transmitted from a remote unit;

determining a transmission time of a next power-control bit;

producing a discontinued measurement of the power-control group by discontinuing, prior to completion, measurement of the power-control group based on the transmission time;

producing a calculated power-control bit based on the measurement of the power-control group; and transmitting the power-control bit to the remote unit to produce a transmitted power-control bit.

10. The method of claim 9 wherein the power-control bit is based on a value of a previous power-control bit.

11. The method of claim 9 wherein the power-control bit is based on a previous value of a power adjustment command and the transmission time of the next power-control bit.

12. An apparatus for controlling power in a communication system comprising:

an integrator for measuring a power-control transmission; and a logic unit coupled to the integrator, said logic unit discontinuing the measurement of the power-control transmission based on a transmission time of a power adjustment command.

13. The apparatus of claim 12 wherein the communication system comprises a spread-spectrum communication system.

14. The apparatus of claim 12 wherein the communication system comprises a code division multiple access (CDMA) communication system.

15. The apparatus of claim 12 wherein the power-control transmission comprises a power-control group.

16. The apparatus of claim 12 further comprising:

a power-control state machine coupled to the integrator, said power-control state machine estimating a value of the power adjustment command; and a transmitter coupled to the power-control state machine, said transmitter transmitting the power adjustment command.

17. The apparatus of claim 16 wherein the estimated value of the power adjustment command is based on the discontinued measurement of the power-control transmission.

18. The apparatus of claim 16 wherein the estimated value of the power adjustment command is based on a previous value of the power adjustment command.

19. A method of power control in a communication system where a delay exists between a measurement of a power-control transmission received by a base station, and a transmission of a power-adjustment command transmitted by the base station, the method comprising the steps of:

determining a transmission rate of a remote unit; and switching between a two time slot delay and a three time slot delay between the measurement and the transmission of the power-adjustment command based on the transmission rate.

* * * * *